DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED MAY 6, 1975

934 OG 7

T934,004
PROCESS

Allen Leroy Blancett, Camden, S.C., assignor to E. I. du Pont de Nemours and Company, Wilmington, Del.

Filed Mar. 1, 1974, Ser. No. 447,255
**Int. Cl. D06p *5/00***
U.S. Cl. 8—17
1 Sheet Drawing. 13 Pages Specification

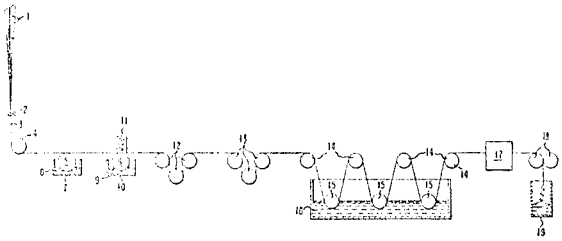

A coordination catalyst system useful at high temperatures, e.g., 75° C., for making elastomeric high molecular weight copolymers of ethylene and at least one alpha-monoolefin of the formula $R—CH_2—CH=CH_2$ wherein R can be hydrogen or an alkyl group of 1 to 15 carbon atoms, said catalyst system consisting essentially of (a) titanium tetrabromide, (b) a diorganoaluminum bromide containing 1 to 18 carbon atoms, e.g., disobutylaluminum bromide, (c) a diorganomagnesium compound represented by the formula $R_1R_2Mg$ wherein $R_1$ and $R_2$ are alkyl, cycloalkyl, aralkyl, alkaryl, alkenyl, aryl substituted alkenyl, or cycloalkenyl, and $R_1$ and $R_2$ contain a total of 8 to 30 carbon atoms, e.g., *n*-butyl-*sec*-butylmagnesium, (d) as a modifier to raise the copolymer molecular weight, an aliphatic ether of the formula R'OR'' wherein R' and R'' represent alkyl groups each having 2 to 5 carbon atoms, and (e) an inert organic diluent, e.g., hexane, with the proviso that the ratios of magnesium atoms to titanium atoms and aluminum atoms to titanium atoms in the catalyst system are in accordance with the following relationships:

$$Al:Ti=A(2\text{–}30):1$$

$$\text{minimum } Mg:Ti=M_{min.}=0.135A+\frac{0.15}{Q}$$

$$\text{maximum } Mg:Ti=M_{max.}=0.826A+\frac{0.05}{Q}$$

where Q is the concentration of Ti (in millimoles/liter) in the reactor liquid phase and ranges from 0.05 to 0.2 and the moles of ether:atom of magnesium being in the range (0.5–1.5):1. The preferred catalyst has components in these proportions: Al:Mg:Ether:Ti=6:3:3:1. It is preferred that the catalyst be formed *in situ* by separate introduction of hydrocarbon solutions of each component; however, catalyst components can be premixed.

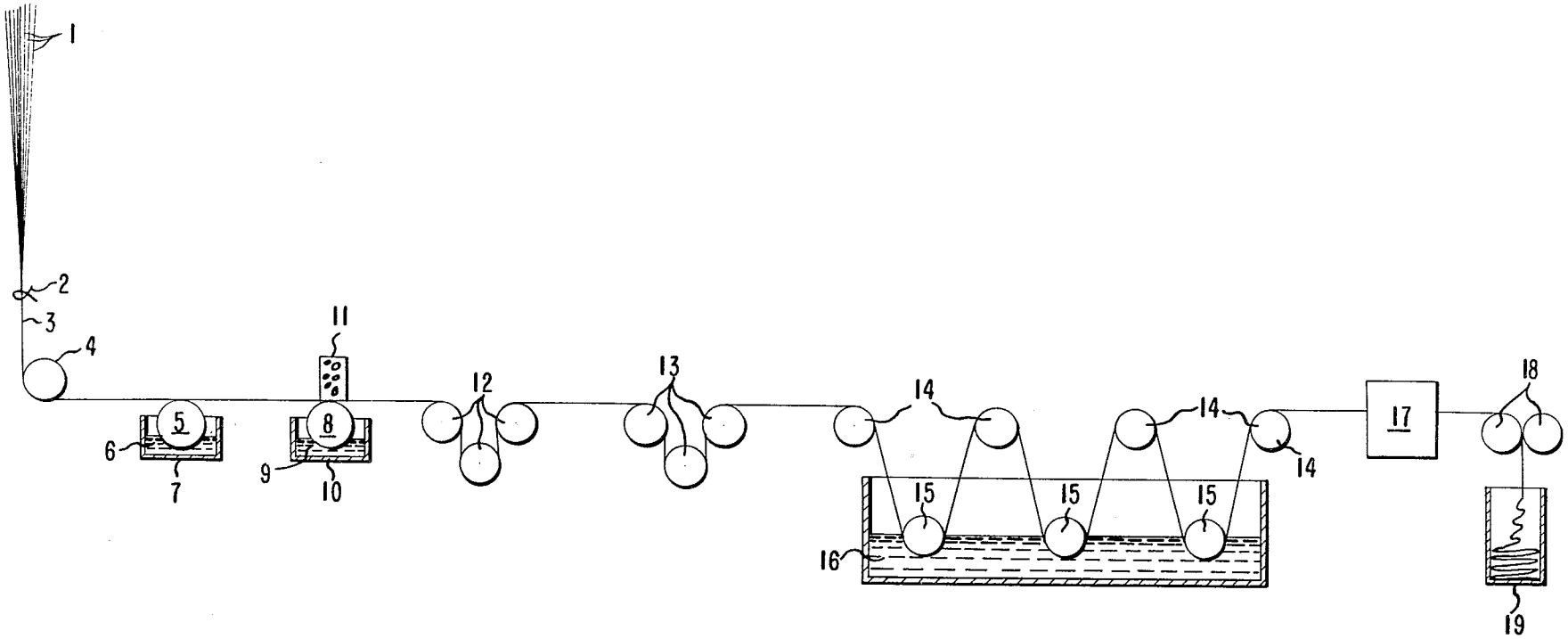

May 6, 1975
A. L. BLANCETT
T934,004
PROCESS
Filed March 1, 1974